UNITED STATES PATENT OFFICE.

ISADOR LADOFF, OF WILKINSBURG, PENNSYLVANIA, ASSIGNOR TO WESTINGHOUSE ELECTRIC AND MANUFACTURING COMPANY, A CORPORATION OF PENNSYLVANIA.

ARC-LAMP ELECTRODE.

1,281,796.  Specification of Letters Patent.  Patented Oct. 15, 1918.

No Drawing.  Application filed June 20, 1914. Serial No. 846,361.

*To all whom it may concern:*

Be it known that I, ISADOR LADOFF, a citizen of the United States, and a resident of Wilkinsburg, in the county of Allegheny and State of Pennsylvania, have invented a new and useful Improvement in Arc-Lamp Electrodes, of which the following is a specification.

My invention relates to arcing electrodes of the luminescent or luminous type in which most of the light is emitted from the arc instead of from the incandescent tip or tips of one or both of the electrodes, as is the case when simple carbon electrodes are used.

My invention refers particularly to the so-called metallic flame electrodes containing titanium, preferably in the form of one or more of its oxids, and some comparatively good conducting metallic material which may also be in the form of one or more of its oxids.

It is well known that the titanium compounds found most serviceable for producing an efficient and white arc produce, at the same time, a very unsteady arc which causes objectionable flickering of the light emitted therefrom. In impregnated carbon electrodes which contain a preponderance of carbon, certain compounds of fluorin are utilized to strengthen the arc and increase its stability. The fluorin compounds usually introduced into electrode compositions for steadying the arc are preferably earth-metal titano fluorids, and, under certain conditions, alkali metal titano-fluorids.

However, in metallic flame electrodes which contain a preponderance of metallic material, such as iron, oxids of iron, etc., fluorin compounds are not particularly effective in precluding the flickering of the arc. For this purpose, I have invented a metallic flame electrode which will produce a steady and efficient arc of desirable color value.

Electrodes containing titanium compounds associated with either carbon or magnetite are in common use. Since titanium carbid, even when associated with a fluorin compound, produces a very unsteady arc, I prefer to use titanium oxid which imparts a yellowish-white tinge to the arc. This is the characteristic color of titanium oxid when burning in an electric arc. Again, I prefer titanium oxid because it is very stable in combination with iron oxid which comprises the main metallic constituent of my electrode. Iron oxid is a very desirable constituent of my electrode because it increases the conductivity of the electrode. While the high efficiency of my electrode results largely from the luminosity of the titanium oxid in the arc, it should be noted that the iron which enters into the arc also gives luminosity to the same, the arc spectrum showing a great many lines resulting from both titanium and iron.

Inasmuch as an electrode of titanium and iron produces an arc which, at times and under certain conditions, is too unsteady for commercial purposes, I add material which precludes flickering of the arc and insures a steady light. The material which I find best suited for steadying the arc produced by an electrode of the above-mentioned composition is a uranium compound. The compound of uranium most easily obtained, and one which produces a highly satisfactory electrode is sodium uranate ($Na_2 U_2 O_7$). However, uranium oxid, or any other uranium compound, may be used to quiet the arc.

In addition to the above constituents, I may add chromium oxid which prolongs the life of the electrode by preventing the too rapid volatilization in the arc of the light-giving materials of the electrode.

I have made an excellent electrode in accordance with my invention by using the following constituents in the proportions stated: Ferroso-ferric oxid or magnetite, 14 parts; iron, 9 parts; titanium oxid, 17 parts; sodium uranate, .46 parts; chromium oxid 1.25 parts.

While I have given the proportions of the constituents suitable for making an electrode, it will be understood that these proportions may be materially varied without departing from my invention. Again, where the term "titanium oxid" is used, the mineral ilmenite having the chemical formula—($Fe_2 O_3$) $y$ ($Ti O$) $x$, where $x$ and $y$ indicate variable quantities, may be employed. While I have specified my preference as to sodium uranate for lending stability to the arc, it will be understood that any uranium compounds may be used to quiet the arc.

The arc produced by my electrode gives a very steady light which is slightly yellow, as a result of the uranium compound. The combination of the uranium and titanium, therefore, produces an arc having a highly satisfactory color value. The luminous efficiency of the arc resulting from my electrode is slightly better than iron-titanium electrodes of the same composition, but which do not contain the uranium compound.

While I have described my invention as particularly applicable to electrodes in which titanium oxid associated with iron is present, it is to be understood that I am not limited to these metallic constituents, and that my invention consists broadly in the addition of uranium material to arcing electrodes for the purpose of steadying the arc.

I claim as my invention:

1. An electrode comprising titanium material mixed with a compound of uranium.
2. An electrode comprising titanium oxid mixed with a compound of uranium.
3. An electrode comprising titanium oxid and sodium uranate.
4. An electrode comprising ferruginous material, titanium material and uranium material.
5. An electrode comprising ferruginous material, titanium material and sodium uranate.
6. An electrode comprising ferruginous material, titanium oxid and sodium uranate.
7. An electrode comprising iron, titanium oxid and sodium uranate.
8. An electrode comprising arcing material mixed with a compound of uranium.
9. An electrode capable of producing a relatively steady arc and comprising arcing material mixed with a compound of uranium.

In testimony whereof I have hereunto subscribed my name this 12th day of June, 1914.

ISADOR LADOFF.

Witnesses:
GOLDIE E. MCGEE,
B. B. HINES.